United States Patent [19]

Chesley

[11] 4,354,207
[45] Oct. 12, 1982

[54] SYSTEM FOR IDENTIFYING AND LOCATING RECORDED ANALOG INFORMATION

[76] Inventor: Gilman D. Chesley, 22431 Starling Dr., Los Altos, Calif. 94022

[21] Appl. No.: 19,471

[22] Filed: Mar. 12, 1979

[51] Int. Cl.³ ............... H04N 5/78; G11B 15/18; H04N 5/76
[52] U.S. Cl. .................... 360/9.1; 360/72.2; 358/335
[58] Field of Search ........ 360/8, 9, 10, 13, 14, 360/33, 74.4, 72.2; 358/127; 179/6 TA, 15.55 T

[56] References Cited

U.S. PATENT DOCUMENTS

| | | | |
|---|---|---|---|
| 3,505,665 | 4/1970 | Lasoff et al. | 340/739 |
| 3,588,334 | 6/1971 | Camras | 360/10 |
| 3,591,731 | 7/1971 | Stanell | 179/6 TA |
| 3,855,424 | 12/1974 | Tharmaratnam et al. | 360/10 X |
| 3,919,716 | 11/1975 | Yumde et al. | 360/10 X |
| 3,934,268 | 1/1976 | Uemura | 360/10 X |
| 3,950,607 | 4/1976 | Southworth et al. | 358/134 |
| 3,986,208 | 10/1976 | Sykes | 360/49 |
| 3,991,265 | 11/1976 | Fukuda et al. | 360/11 X |
| 4,000,518 | 12/1976 | Stearns | 179/100.1 PS |
| 4,020,291 | 4/1977 | Kitamura et al. | 360/8 X |
| 4,133,009 | 1/1979 | Kittler et al. | 360/9 |
| 4,167,759 | 9/1979 | Tachi | 360/72.2 X |
| 4,189,758 | 2/1980 | Morio et al. | 360/DIG. 1 |

FOREIGN PATENT DOCUMENTS

| | | | |
|---|---|---|---|
| 1109423 | 4/1968 | United Kingdom | 360/74.4 |
| 1254295 | 11/1974 | United Kingdom | 360/14 |

*Primary Examiner*—Aristotelis M. Psitos
*Attorney, Agent, or Firm*—Flehr, Hohbach, Test, Albritton & Herbert

[57] ABSTRACT

System for identifying and locating analog information recorded on a serial access read/write medium. In some embodiments, the analog signal is sampled by scanning the medium, and a memory is employed to normalize the rate at which the sampled signals are output. In one embodiment, the memory is also utilized to compress the sampled signals, and in another, externally generated identifying information is recorded with the analog information.

10 Claims, 6 Drawing Figures

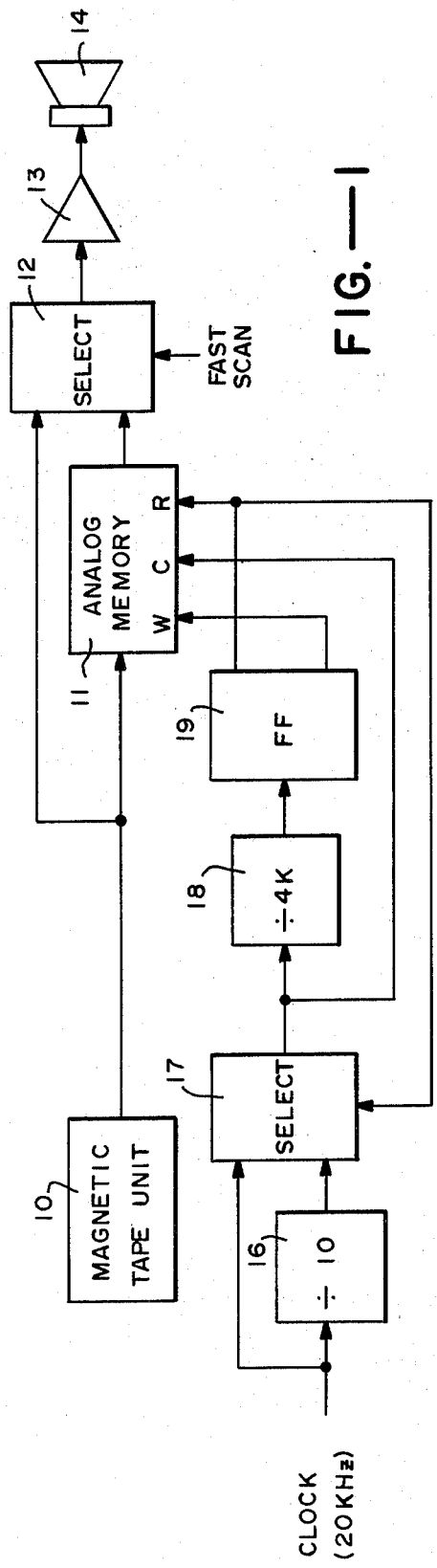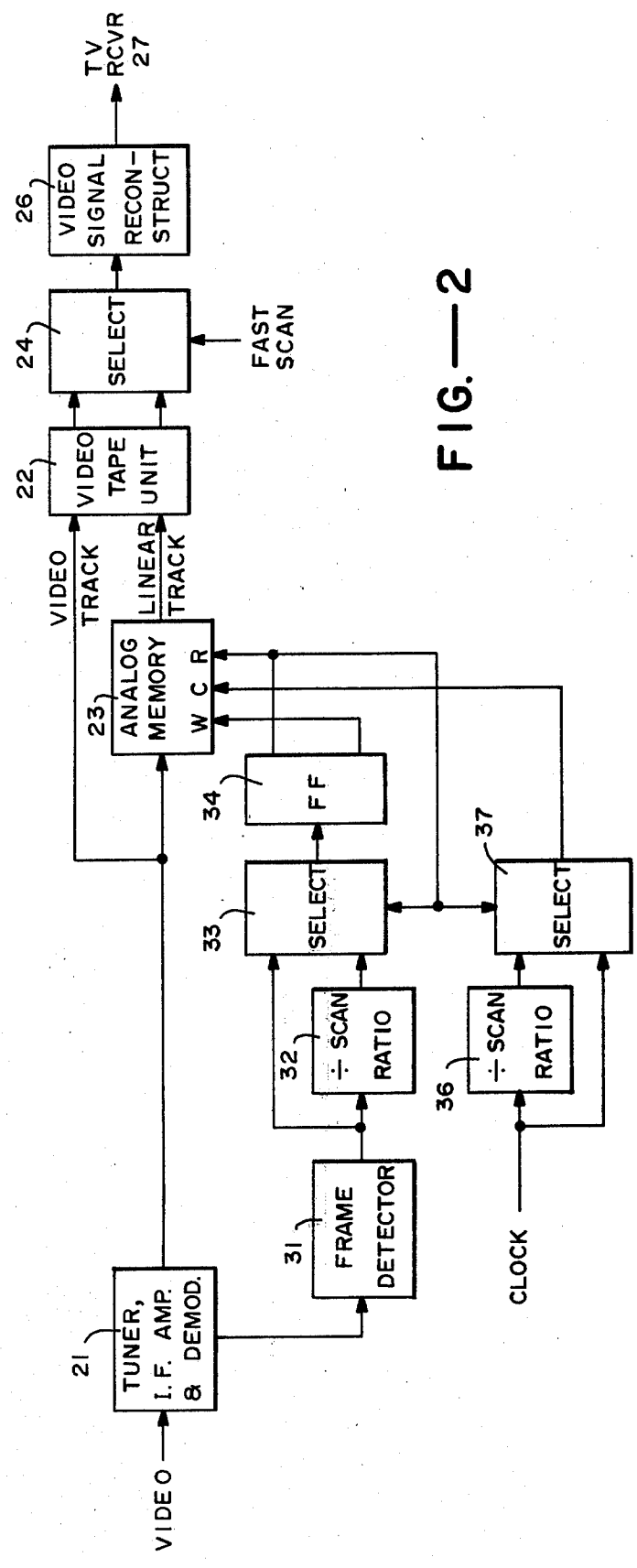

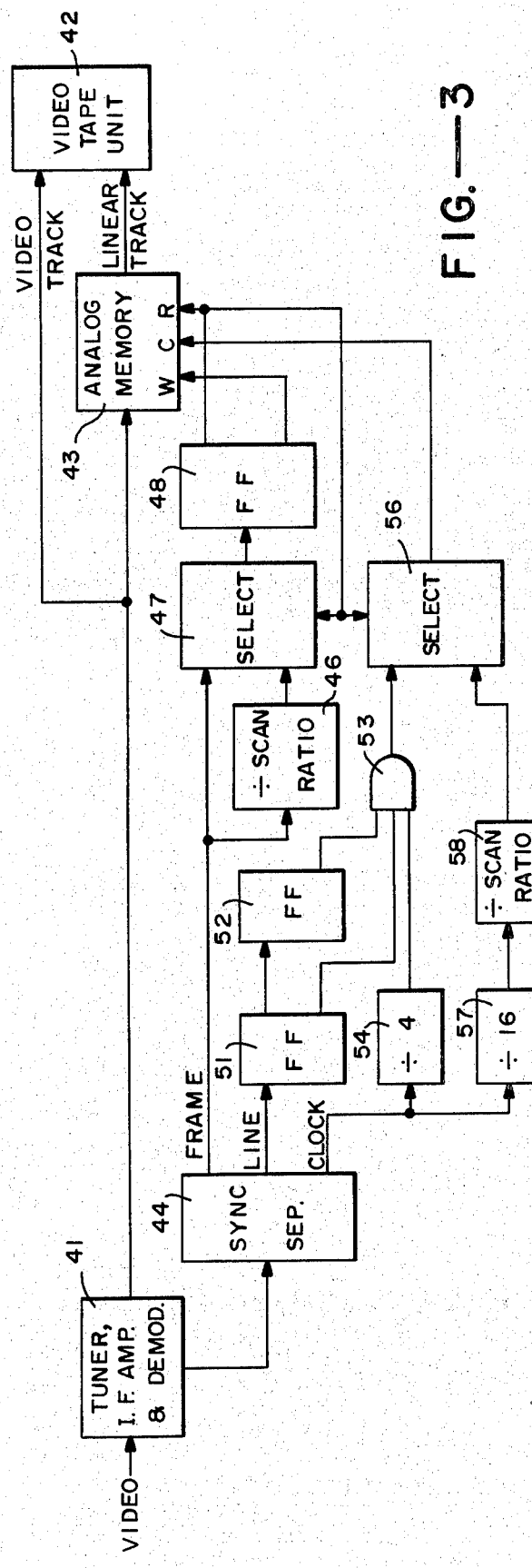
FIG.—3
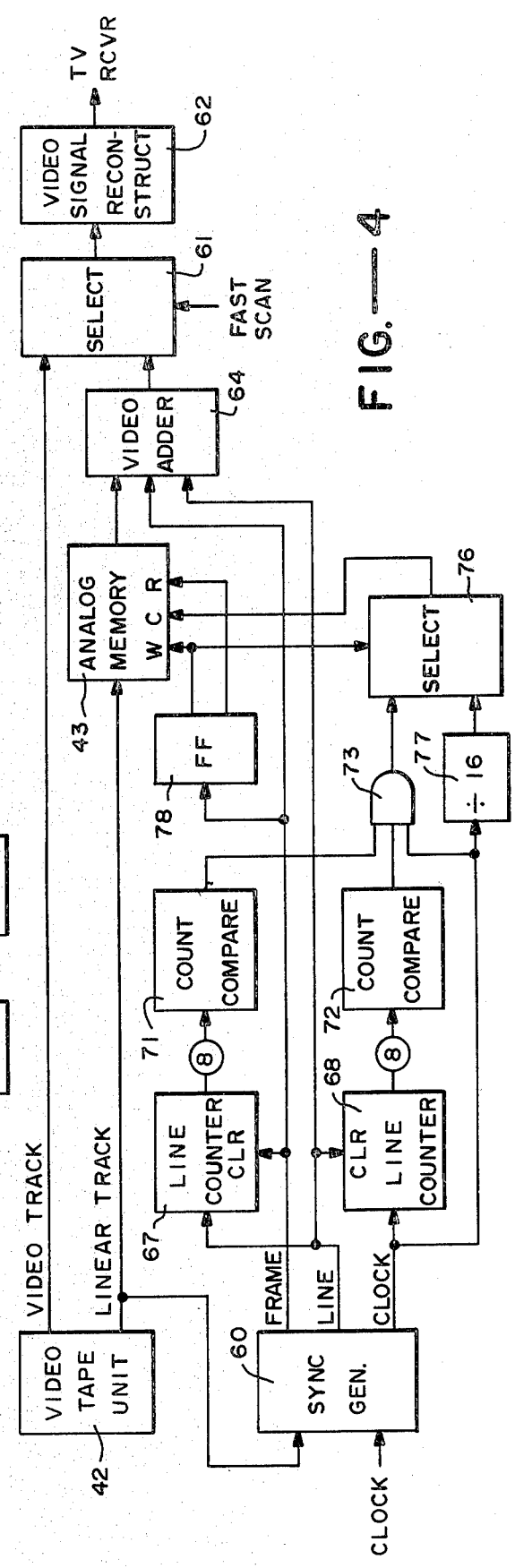
FIG.—4

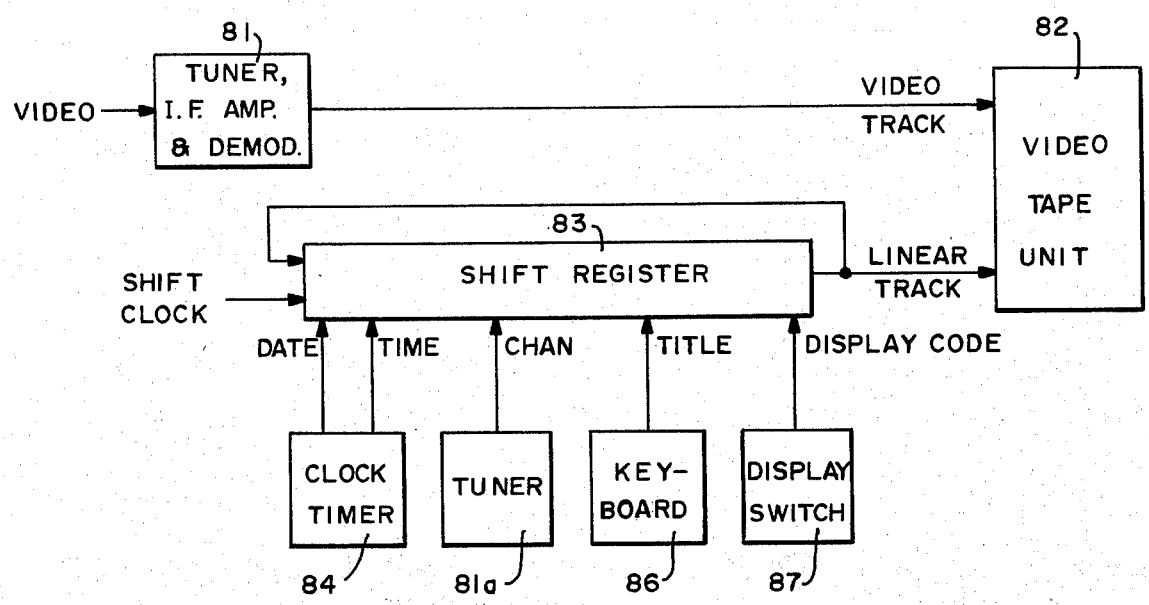
FIG.—5
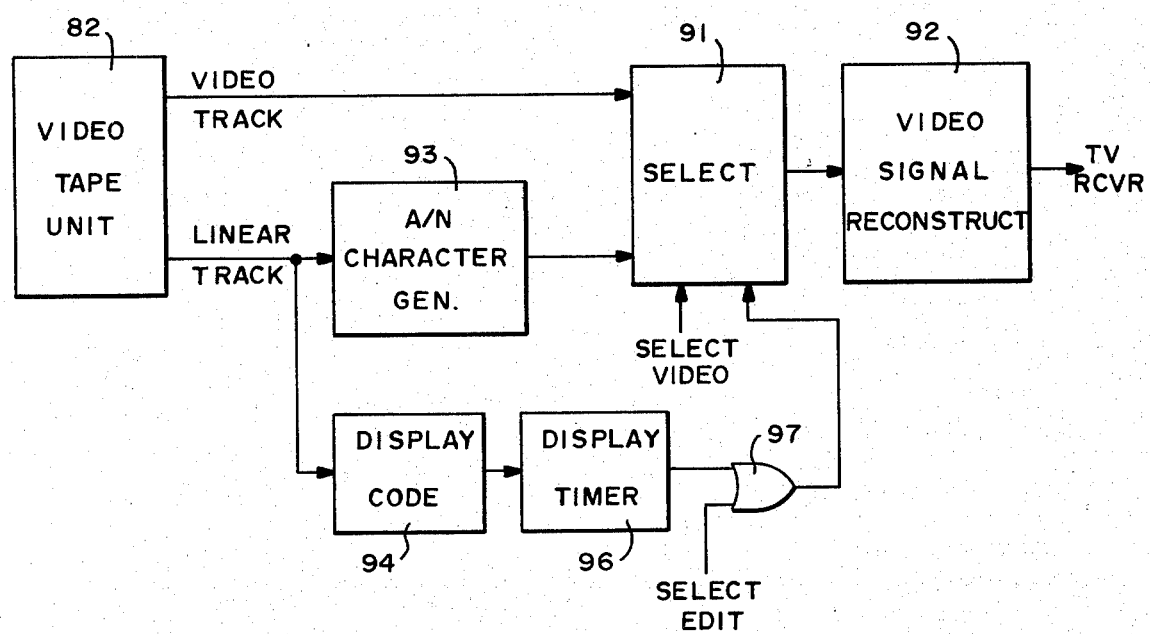
FIG.—6

SYSTEM FOR IDENTIFYING AND LOCATING RECORDED ANALOG INFORMATION

This invention pertains generally to the recording of analog signals such as audio and video signals and more particularly to a system for monitoring or identifying recorded signals when the record medium is scanned at an accelerated rate.

Analog signals such as audio and video signals are commonly recorded on a serial access read/write memory such as a magnetic recording tape moving past a transcribing head. To maintain a proper time base relationship, the signals are written and read at the same scan rate or tape speed. Frequently, the medium is advanced or scanned at an accelerated rate to a point where signals are to be transcribed, and in the case of magnetic recording tape the point is commonly located by means of a mechanical counter. There is generally no direct correlation between the counter and the material recorded on the tape, and positional relationship between the counter and tape is subject to change and is therefore imprecise.

It is in general an object of the invention to provide a system for accurately identifying and locating analog information recorded on a serial access read/write medium.

Another object of the invention is to provide a system of the above character in which the information can be identified and located while the medium is scanned at an accelerated rate.

Another object of the invention is to provide a system of the above character in which a portion of the recorded information is reproduced in real time while the medium is being scanned at an accelerated rate.

Another object of the invention is to provide a system of the above character in which identifying information is recorded on the medium with the analog information.

These and other objects of the invention are achieved in one embodiment by providing a system having an analog memory and means for reading a portion or sample of the analog information from the read/write medium into the memory at one rate as the medium is scanned. The information is then read out of the memory at a different rate to provide a signal which can be reproduced with the normal time base and monitored to identify the recorded information. In another embodiment, information read into the memory is compressed to save memory space, and in a further embodiment, externally generated identification information is stored on the record medium in position to be transcribed concurrently with the analog information.

FIG. 1 is a block diagram of one embodiment of a system according to the invention for identifying and locating audio information on a record medium.

FIG. 2 is a block diagram of one embodiment of a system according to the invention for outputting selected portions of a video signal at a normal rate during fast scanning of the medium on which the signal is recorded.

FIGS. 3 and 4 are block diagrams of one embodiment of a video signal identifying and locating system according to the invention employing bandwidth compression.

FIG. 5 is a block diagram of one embodiment of a system according to the invention for storing externally generated identification information on the record medium.

FIG. 6 is a block diagram of one embodiment of a system according to the invention for retrieving the externally generated identification information stored by the embodiment of FIG. 5.

In the embodiment of FIG. 1, the output of a magnetic tape unit 10 is connected to the input of a serial access analog memory 11 and to the input of a selector 12. The output of the selector is connected to the input of an amplifier 13, and the output of the amplifier is connected to a speaker 14. In the preferred embodiment, the analog memory is a clocked metal oxide semiconductor delay line consisting of capacitors interspersed with field-effect transistors, commonly known as a bucket-brigade device (BBD). A suitable BBD is the Intermetall UAA-1000 which utilizes 4,000 FET's and about the same number of capacitors to provide storage for 4,000 analog signal segments or elements. A control signal, designated FAST SCAN in FIG. 1, is applied to the control input of selector 12 and determines whether the input signal to amplifier 13 comes from the memory or directly from the tape unit.

Means is provided for reading selected portions of the information from tape unit 10 into and out of memory 11 at different rates so that material read from the tape unit at an accelerated scanning rate can be captured and reproduced at a normal rate. This means includes a dividing counter 16 to which clock pulses from a suitable source (not shown) are applied. The capacity of the dividing counter corresponds to the ratio of the fast and normal scanning speeds, and for a fast scan speed which is ten times the normal scan speed, for example, counter 16 is a divide-by-10 counter. The output of the counter is connected to one input of a selector 17, and the undivided clock pulses are applied to a second input of this selector. The output of selector 17 is connected to the clock input of memory 11 and to the input of a second dividing counter 18. This counter has a capacity corresponding to the capacity of the memory, e.g., 4,000 in the present example. The output of counter 18 is connected to the input of a T-type flip-flop 19, and the outputs of this flip-flop are connected to the READ and WRITE control inputs of the memory. The output connected to the READ control line is also connected to the control input of selector 17.

Operation and use of the embodiment of FIG. 1 is as follows. It is assumed that the clock pulses occur at a rate of 20 KHz and that tape unit 10 is operating in the FAST SCAN mode, with selector 12 conditioned to output signals from memory 11 to amplifier 13. It is further assumed that flip-flop 19 is initially in its OFF state, thereby enabling the WRITE line of the memory and conditioning selector 17 to pass the undivided 20-KHz clock pulses to counter 18 and to the memory. On each successive clock pulse, a segment of the information from the tape unit is captured in the memory until 4,000 segments have been captured, whereupon the state of flip-flop 19 changes. Thereafter, the clock pulses are delivered to the memory and counter 18 from counter 16 at the rate of 2 KHz, and the stored segments are read out of the memory and delivered to the amplifier and speaker at the normal scan rate. When all of the stored segments have been read out, the flip-flop returns to its initial state, and 4,000 more segments are captured from the tape. With the values given in this example, the recorded signals are sampled for a period of 0.2 second, and the sampled signals are reproduced in real time for a period of 2 seconds.

In this manner, real time segments are selected and output to the user for editing purposes so that the decision of when to stop the fast scan can be made by direct reference to the recorded information. This is a sampling process, and in the example given, 20 seconds of recorded information are scanned over for each 2-second segment which is sampled. This system can be employed with any audio signal, including the audio track of a videotape system. It can also be utilized during accelerated tape movement in the reverse direction if the information is read into and out of the memory in opposite directions. The system can also be utilized for monitoring signals recorded in the helically scanned tracks, provided that appropriate steps are taken to maintain proper tracking notwithstanding the change in linear tape speed. For example, the skew angle of the video tracks is a function of the linear tape speed, and small multiples of the linear speed can be accommodated by shifting the tape guides to maintain the proper skew angle. The fast scanning rate must be an exact multiple of the normal linear rate in order to provide proper alignment of the video head at the start of each track to be scanned, and feedback control must be employed with the linear tape drive in order to maintain proper tracking throughout the track. In addition, the video heads and the electronic circuitry must accommodate the increased bandwidth and reduced synchronization rate produced by this technique. Thus, while the system of FIG. 1 can be utilized for video signals, it is better suited for audio signals, and the embodiments described hereinafter are preferred for video signals.

In the embodiment of FIG. 2, the incoming video signal is applied to the tuner, IF amplifier and demodulator stages 21 of a videotape recorder 22 where it is processed in the conventional manner and converted to the proper format for recording on the videotape. The formatted signal is delivered both to the video heads of the recorder for recording in the conventional manner on the video track of the tape and to the input of an analog memory 23. This memory is generally similar to memory 11, but in the preferred embodiment memory 23 has two sections so that it can store information for one video frame while outputting information for a previous frame. Signals from the memory are delivered to the recording heads for recording in a linear track on the videotape, and a selector 24 delivers the signals from the tape to a conventional video signal reconstructor 26, where the signals are modulated onto a suitable carrier for application to a television receiver 27.

Means is provided for reading selected portions of the demodulated video signal into memory 23 at a rate corresponding to the normal scan rate and reading the information out of the memory at a reduced rate for subsequent display at the normal rate during fast scanning of the tape. This means includes a frame detector 31 which is connected to the input stages of the recorder and generates frame timing pulses in response to the incoming video signal. The output of the frame detector is connected to the input of a dividing counter 32 and to one input of a selector 33. Counter 32 has a capacity corresponding to the fast/normal scan ratio, e.g., 10, and the output of this counter is connected to a second input of selector 33. The output of this selector is connected to the input of a T-type flip-flop 34, and the outputs of this flip-flop are connected to the READ and WRITE control inputs of memory 23. Clock pulses from a suitable source (not shown) are applied to the input of a second dividing counter 36 and to one input of a selector 37. Counter 36 also has a capacity corresponding to the fast/normal scan ratio, and the output of this counter is connected to a second input of selector 37. The output of selector 37 is connected to the clock input of memory 23. The control inputs of selectors 33,37 are connected to the same output of flip-flop 34 that is connected to the READ input of the memory.

Operation and use of the system of FIG. 2 is as follows. It is assumed initially that the videotape unit is operating at the normal scan speed in the recording mode and that the video signal is being recorded on the video track of the tape in the normal manner. At the same time, segments of the video signal are sampled and recorded at a reduced rate on a linear track of the tape for subsequent reproduction at the normal rate when the tape is moved at an accelerated rate. In this regard, flip-flop 34 is initially in its OFF state, enabling the WRITE line of memory 23 and conditioning selectors 33,37 to pass the undivided frame and clock pulses to the flip-flop and memory. Segments of the video signal for one frame of the picture are thus clocked into the memory at the normal rate. Upon completion of the frame, flip-flop 34 changes state, enabling the READ line of the memory and conditioning selectors 33,37 to pass the frame and clock pulses at the reduced rate determined by counters 32,36. The video segments are thus read out of the memory at the reduced rate and recorded on a linear track of the tape. When all of the segments for the frame have been read out of the memory, flip-flop 34 returns to its initial state, and another frame is sampled. The sampling and writing of the signals on the linear track continues throughout the recording process, and these signals are then available whenever the tape is scanned.

In the fast scan mode, the FAST SCAN signal conditions selector 24 to pass the signals from the linear track to the video reconstructor for display on the television receiver. Since these signals are recorded at a reduced rate, during fast scan they are reproduced and displayed at the normal rate. The display can then be utilized as desired for identifying, locating or editing the signals recorded on the video track. In the normal playback mode, the FAST SCAN signal is removed, and selector 24 passes the signals from the video track for display in the normal manner on the television receiver.

FIGS. 3 and 4 illustrate a system for use with video signals, with bandwidth compression of the stored signals. In this embodiment, as in the embodiment of FIG. 2, the incoming video signal is applied to the tuner, IF amplifier and demodulator stages 41 of a videotape recorder 42. The demodulated and formatted video signal is delivered to the video recording heads and to the input of an analog memory 43 similar to memory 23. As in the embodiment of FIG. 2, the output of the memory is connected to the recording head section for recording on a linear track of the videotape.

A sync separator 44 is connected to input stages 41 and derives FRAME, LINE and CLOCK timing pulses from the video signal. The FRAME pulses are applied to the input of a dividing counter 46 and to the input of a selector 47. Counter 46 has a capacity corresponding to the fast/normal scan ratio, and the output of this counter is connected to a second input of selector 47. The output of the selector is connected to the input of a T-type flip-flop 48, and the outputs of this flip-flop are connected to the READ and WRITE control inputs of memory 43. Counter 46, selector 47 and flip-flop 48 function in a manner similar to elements 32-34 of FIG. 2 to define the memory reading and writing cycles.

Means is provided for passing only a portion of the picture elements of a selected frame to the analog memory in order to effect compression of the signals stored in the memory. In the embodiment illustrated, compression ratios of 4:1 are utilized in both the horizontal and vertical directions. However, as will be apparent to those familiar with the art, any other convenient compression ratio(s) can be employed, if desired. The line pulses from the sync separator are applied to the input of a flip-flop 51, and one output of this flip-flop is connected to the input of a second flip-flop 52. The second output of the first flip-flop and the corresponding output of the second flip-flop are connected to inputs of an AND gate 53. The clock pulses from the sync separator are applied to a divide-by-4 counter 54, and the output of this counter is connected to a third input of the AND gate. The output of this gate is connected to one input of a selector 56. The clock pulses are also applied to the input of a divide-by-16 counter 57, and the output of this counter is connected to the input of a dividing counter 58 having a capacity corresponding to the fast/normal scan ratio. The output of this counter is connected to a second input of selector 56, and the output of this selector is connected to the clock input of memory 43. Control signals for selectors 47,56 are provided by the output of flip-flop 48 which is connected to the READ control line of the memory.

During the WRITE cycle, selector 56 delivers clock pulses to the memory from AND gate 53. Since the LINE pulse rate is divided by 4 by flip-flops 51,52 and the CLOCK pulse rate is divided by 4 by counter 54, clock pulses appear at the output of AND gate 53 only for every fourth element of every fourth line of a frame of the picture. The elements or segments of the picture are thus read into the memory at the normal scan rate, but with 4:1 compression in both the horizontal and vertical directions.

During the reading portion of the cycle, selector 56 delivers clock pulses to the memory at a reduced rate from counters 57,58. Consequently, the signals are read out of the memory and written on the linear track of the tape at the reduced rate so that they can be reproduced at the normal rate when the tape is scanned at an accelerated rate.

As illustrated in FIG. 4, the signals from the video track are applied to one input of a selector 61, and the output of this selector is connected to the input of a video signal reconstructor 62 which modulates the signal from the selector onto a suitable carrier for application to a television receiver. The signals from the linear track of the tape are applied to the input of analog memory 43, and the output of the memory is connected to one input of a video adder 64. The output of the adder is connected to a second input of selector 61.

The signal from the linear track is also applied to the input of a sync generator 66 which provides frame (vertical), line (horizontal) and clock (pixel) timing pulses for reconstruction of the compressed signal. The frame and line pulses are applied to inputs of video adder 44, and the line and clock pulses are applied to the inputs of counters 67,68. For frames having 256 lines and 256 picture elements (pixels) per line, counters having a capacity of 256 are utilized. The frame and line pulses are also applied to the CLEAR inputs of counters 67,68, respectively. The counts in the counters are monitored by comparators 71,72 which, for a centered, one-fourth size picture, provide true outputs for counts 97-160, inclusive. The outputs of the comparators are connected to first and second inputs of an AND gate 73, and the clock pulses from the sync generator are applied to a third input of this gate. The output of gate 73 is connected to one input of a selector 76, and clock pulses at 1/16 of the normal clock rate are applied to a second input of the selector by a divide-by-16 counter 77. The output of this selector is connected to the clock input of memory 43.

Reading and writing cycles for the memory are established by a T-type flip-flop 78 which receives the frame pulses from sync generator 66. The outputs of the flip-flop are connected to the READ and WRITE control inputs of the memory, and the output connected to the WRITE line is also connected to the control input of selector 76.

As in the previous embodiments, flip-flop 76 selects the frames to be written into and read out of memory 43. During the writing cycle, selector 76 delivers clock pulses to the memory from AND gate 73. These pulses determine the position in which the compressed picture will be displayed on the television screen, as determined by counters 67,68 and comparators 71,72.

During the reading cycle, selector 76 delivers clock pulses to the memory from counter 77, and the stored signals are read out of the memory at the rate determined by these pulses. The signals from the memory are combined with the frame and line signals in video adder 64, and during fast scan, the signal from the adder is delivered to the reconstructor for display on the television receiver. During normal playback, the signal from the video track of the recorder is passed by the selector and displayed.

In the embodiments described thus far, the signals which are utilized for monitoring the audio or video signals are obtained by sampling the audio or video signals themselves. In the embodiments of FIGS. 5 and 6, the identifying signals are generated externally and recorded on a linear track of the tape.

As illustrated in FIG. 5, the video signal is applied to the tuner, IF amplifier and demodulator stages 81 of a videotape recorder 82, and the demodulated video signal is delivered to the recording heads for recording on the video track in the conventional manner. A shift register 83 receives DATE and TIME inputs from a clock timer 84 and a CHANNEL input from the video recorder tuner 81a. The shift register also receives an alphanumeric (TITLE) input from a manually operable keyboard 86 and a DISPLAY CODE input from a display switch 87. This switch can, for example, be mounted on the video camera. The output of the shift register is connected to the recording heads, and the signals from the shift register are recorded on the linear track of the tape.

As illustrated in FIG. 6, the signal from the video track of the tape is applied to one input of a selector 91, and the output of this selector is connected to the input of a video signal reconstructor 92 which modulates the signal from the selector onto a suitable carrier for application to a television receiver. The signals from the linear track are delivered to an alphanumeric character generator 93 and a display code detector 94. The output of the character generator is connected to a second input of selector 91, and the output of the display code detector is connected to the input of a timer 96. The timer delivers an output signal for a predetermined period, e.g., five seconds, upon receipt of a signal from the display code detector. The output of the timer is connected to one input of an OR gate 97, and the output of this gate is connected to one control input of selector 91. A SELECT EDIT signal is applied to a second input of the OR gate, and a SELECT VIDEO signal is applied to a second input of the selector.

Operation and use of the system of FIGS. 5 and 6 is as follows. The desired identifying and editing information is read into shift register 83 from the various input devices. The desired information is then shifted out of the shift register and recorded on the linear track of the tape while the video signal is being recorded on the video track. During playback, selector 91 causes either the video information or the identifying/editing information or both to be reproduced. The video information is selected by application of the SELECT VIDEO signal to the selector. The identifying/editing information is selected either by application of the SELECT EDIT signal to OR gate 97 or by detection of the display code recorded on the tape. Upon detection of the display code, timer 96 delivers a signal to the OR gate, which causes the identifying/editing information to be displayed for the period of the timer.

The information provided by the system of FIGS. 5 and 6 can be used in conjunction with the fast scan display of the previous embodiments. With the system of FIGS. 3 and 4, for example, the video input of selector 91 would come from selector 61, and the editing information would be positioned on the screen where it does not interfere with the reduced and compressed fast scan display. If used without the video display, only the editing information would be seen.

Although the invention has been described with specific reference to magnetic tape recorders, it is equally applicable to other types of serial access read/write media such as magnetic bubbles, charge-coupled devices and video discs. Also, in the event that the analog signal is digitally encoded, a digital memory can be employed instead of an analog memory.

It is apparent from the foregoing that a new and improved system for identifying and locating recorded analog information has been provided. While only certain presently preferred embodiments have been described herein, as will be apparent to those familiar with the art, certain changes and modifications can be made without departing from the scope of the invention as defined by the following claims.

What is claimed is:

1. In a system for monitoring analog information recorded on a serial access read/write medium for display on the screen of a video display device: means for recording identifying information on the medium in position to be transcribed concurrently with the analog information, means for transcribing the identifying information concurrently with the analog information to provide an identifying signal for the information as said information is transcribed, means for recording a display command signal on the medium where a display of the identifying information is desired, and means responsive to the display command signal for presenting the identifying signal to the video display device to provide a display of the identifying information with the analog information on the video screen.

2. The system of claim 1 wherein the means for recording identifying information includes means for recording date and time information relating to the analog information.

3. The system of claim 1 wherein the analog information is a television signal received through a tuner and the means for recording identifying information includes means connected to the tuner for recording information indicative of the channel on which the signal is received.

4. The system of claim 1 wherein the means for recording identifying information includes a keyboard for inputting alphanumeric character information for identifying the analog signal.

5. The system of claim 1 wherein the video display device is a television receiver.

6. The system of claim 1 wherein the means for recording identifying information comprises a memory and means for sampling the analog information and storing signals corresponding thereto in the memory at a first rate, and the means for transcribing the identifying information comprises means for reading the stored signals out of the memory at a second rate slower than the first rate and means responsive to the signal read out of the memory for reproducing the sampled portion of the analog information on the screen of the display device.

7. The system of claim 6 wherein the record medium is a video tape.

8. The system of claim 7 wherein the signals read out of the memory are recorded on the tape.

9. The system of claim 6 wherein the memory comprises a bucket brigade device.

10. The system of claim 6 wherein the means for sampling the analog information includes means for sampling temporally displaced portions of the information in order to effect compression of the information.

* * * * *